(12) United States Patent
Stickle et al.

(10) Patent No.: US 10,275,326 B1
(45) Date of Patent: Apr. 30, 2019

(54) DISTRIBUTED COMPUTING SYSTEM FAILURE DETECTION

(71) Applicant: Amazon Technologies, Inc., Seattle, WA (US)

(72) Inventors: Thomas Charles Stickle, Saint James, NY (US); Steven Reynolds Jones, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 107 days.

(21) Appl. No.: 14/530,149

(22) Filed: Oct. 31, 2014

(51) Int. Cl.
*G06F 11/00* (2006.01)
*G06F 11/20* (2006.01)

(52) U.S. Cl.
CPC ............... *G06F 11/2002* (2013.01)

(58) Field of Classification Search
CPC ............ G06F 11/2002; G06F 11/2028; G06F 11/0709; H04L 12/2422; H04L 29/14
USPC .......................................................... 714/4.1
See application file for complete search history.

(56) References Cited

U.S. PATENT DOCUMENTS

| | | | | |
|---|---|---|---|---|
| 5,848,243 A | * | 12/1998 | Kulkarni | H04L 41/0233 709/224 |
| 7,509,535 B1 | * | 3/2009 | Gulve | G06F 11/201 714/18 |
| 8,918,673 B1 | * | 12/2014 | Rangaiah | G06F 11/008 714/4.11 |
| 9,471,585 B1 | * | 10/2016 | Theimer | G06F 17/30156 |
| 9,672,116 B1 | * | 6/2017 | Chopra | G06F 11/1464 |
| 9,854,420 B2 | * | 12/2017 | Sundararaj | H04W 4/90 |
| 2006/0080568 A1 | * | 4/2006 | Subbaraman | G06F 11/2023 714/47.3 |
| 2006/0165074 A1 | * | 7/2006 | Modi | H04L 29/12367 370/389 |
| 2008/0239945 A1 | * | 10/2008 | Gregg | G06F 11/2005 370/217 |
| 2010/0162036 A1 | * | 6/2010 | Linden | G06F 11/181 714/4.11 |
| 2011/0214007 A1 | * | 9/2011 | Sreenivasan | G06F 11/2023 714/4.11 |

(Continued)

OTHER PUBLICATIONS

Wikipedia definition of "computer program", retrieved from https://en.wikipedia.org/wiki/Computer_program on Mar. 27, 2017.*

*Primary Examiner* — Yair Leibovich
(74) *Attorney, Agent, or Firm* — Thorpe North & Western, LLP

(57) ABSTRACT

A technology is described for detecting a failure of a distributed system component. An example method may include registering a declarative file that may identify a distributed computing cluster in a service provider environment and provide failure criteria used to detect a failure of a distributed system component included in the distributed computing cluster. Distributed system components included in the distributed computing cluster may then be identified using information included in the declarative file. A distributed system component included in the distributed computing cluster may then be queried according to query criteria provided by the declarative file and a failure state of the distributed system component included in the distributed computing cluster may be identified based in part on a result of querying the distributed system component.

18 Claims, 9 Drawing Sheets

(56) References Cited

U.S. PATENT DOCUMENTS

| | | | | |
|---|---|---|---|---|
| 2013/0117382 A1* | 5/2013 | Gaddam | ................ | H04L 67/26 |
| | | | | 709/206 |
| 2017/0068588 A1* | 3/2017 | Pourali | ............... | H04L 41/0836 |
| 2018/0287864 A1* | 10/2018 | Hockett | ................ | H04L 41/082 |
| 2018/0314599 A1* | 11/2018 | Aron | ....................... | H04L 61/30 |
| 2018/0315051 A1* | 11/2018 | Hurley | .............. | G06Q 20/4016 |

* cited by examiner

Declarative File 402

```
<Clusters>
<Cluster name="ClusterA" query="xxx:xxx:xxx:xx:454" response="xxx:xxx:xxx:xx:454" queryInterval="5" failInterval="3" FailoverTo="ClusterB">
    <ComputingInstanceType>large</ComputingInstanceType>
    <VNI>vni-123</VNI>
    <Alias>master1</Alias>
    <ComputingInstanceType>large</ComputingInstanceType>
    <Alias>worker1</Alias>
    <ComputingInstanceType>large</ComputingInstanceType>
    <Alias>worker2</Alias>

</Cluster>

<Cluster name="ClusterB" query="xxx:xxx:xxx:xx:454" response="xxx:xxx:xxx:xx:454" queryInterval="5" failInterval="3" FailoverTo="ClusterA">

<ComputingInstanceType>large</ComputingInstanceType>
    <VNI>vni-123</VNI>
    <Alias>master1</Alias>
    <ComputingInstanceType>large</ComputingInstanceType>
    <Alias>worker1</Alias>
    <ComputingInstanceType>large</ComputingInstanceType>
    <Alias>worker2</Alias>

</Cluster>
</Clusters>
```

FIG. 4

DISTRIBUTED COMPUTING SYSTEM FAILURE DETECTION

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to host multiple computing instances using a hypervisor. Each computing instance may be a guest machine acting as a distinct logical computing system on the physical computing machine (i.e., a physical host). Computing instances may be logically grouped into distributed computing clusters where the computing instances communicate via a network. A number of distributed computing clusters may be used in some cases to execute a distributed system, such as a distributed database system, distributed file system, peer-to-peer systems, etc.

A distributed system may utilize a distributed program or application to facilitate communications and coordinate actions between a number of distributed computing clusters and computing instance nodes by exchanging messages between various components included in the distributed system. A characteristic of a distributed system that may contribute to the performance of the distributed system may be independent failures of distributed system components, such as a distributed computing cluster, a computing instance node or a computing module executing on a computing instance node. In some cases, a distributed computing system may continue to operate after experiencing an independent failure, whereas in other cases the independent failure may cause the distributed computing system to shut down.

BRIEF DESCRIPTION OF THE DRAWINGS

FIG. 4 is an illustration of an example declarative file that may be registered with a failover service.

DETAILED DESCRIPTION

Figure 1:
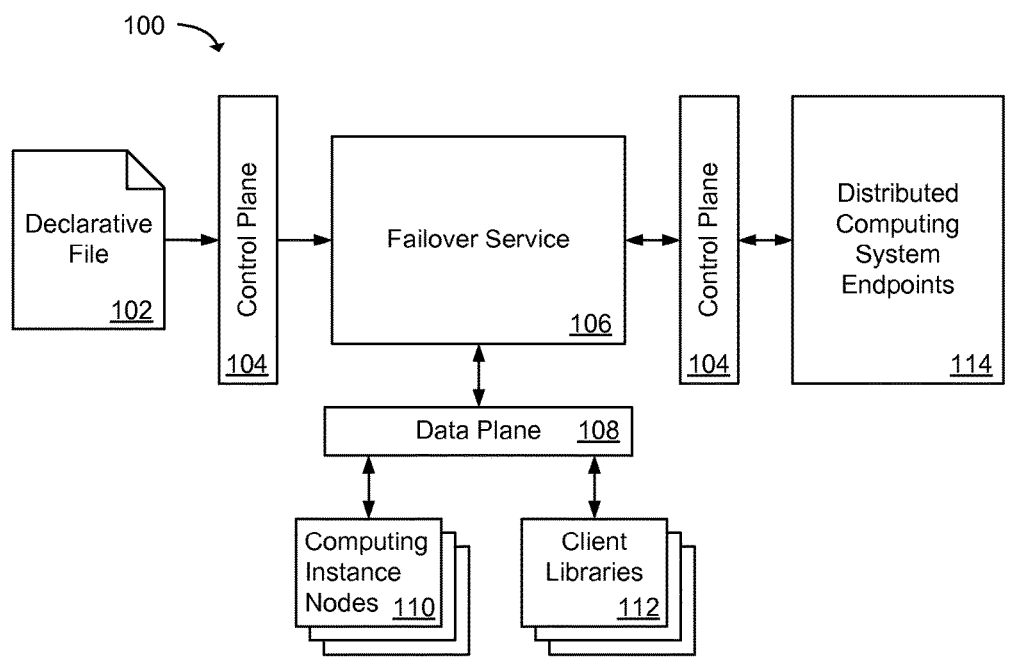
FIG. 1 is a block diagram illustrating an example system for detecting a failure of a component within a distributed computing system.

A technology is described for a failover service that may be configured to detect a failure of a component included in a distributed computing system and perform management actions (e.g., a failover action or starting a computing instance) when a failure is detected. In one example configuration, a declarative file may be registered with the failover service. The declarative file may be associated with a distributed computing system (e.g., a distributed database system, a distributed high-performance compute cluster, a distributed file system, peer-to-peer system, etc.) and may include information used to identify components (e.g., a distributed computing cluster, computing instance nodes and distributed system services) included in the distributed computing system. Further, the declarative file may include failure criteria used to detect a failure of a component included in the distributed computing system (e.g., a failure of a distributed computing cluster, computing instance node or distributed service). The declarative file may also provide a failover action that may be executed as a result of detecting a failure of a component included in a distributed computing system.

In addition to the declarative file, one or more client libraries may be registered with the failover service. A client library may be associated with a distributed service (e.g., a distributed database system, a distributed file system, a MapReduce cluster, etc.) where instructions for connecting to and communicating with the distributed service may be provided by the client library. For example, the client library may provide an API (Application Programming Interface), a driver, a connection string or other instructions used to connect to a distributed computing system, enabling the failover service to query the distributed computing system.

Using the information provided by the declarative file, the failover service may be configured to query distributed system components to determine a state of the distributed system components. For example, the queries may be used to determine whether a distributed system component may be capable of responding to a query. As an illustration, various levels of shallower queries may be used to determine the state of distributed system components that are platforms (e.g., operating systems, and computing instances) and various levels of deeper queries may be used to determine the state of low level distributed system components on such platforms. In a case where a distributed system component responds to a query, the distributed system component may be in an active state. Whereas, in a case where a distributed system component does not respond to a query, the distributed system component may be in a failure state.

In one example, upon a determination that a distributed system component may be in a failure state, the failover service may be configured to execute a failover action specified in the declarative file. A failover action may specify actions that may be performed in the event of a failure of a distributed system component. In one example, a notice may be provided to a customer associated with the distributed computing system, thereby alerting the customer to the failure allowing the customer to take action to remedy the failure. In another example, the failover action may specify remedial actions that may be performed in the event of a failure.

Distributed computing systems may be complex due to a number of components included in a distributed computing system that interact with one another. Differences between types of distributed computing systems may result in one type of distributed computing system being able to continue to operate after a failure of a component included in the distributed computing system, whereas another type of distributed computing system may cease operating upon a failure of a component. These distributed computing systems may, in some cases, lack functionality capable of detecting or reporting a failure of a distributed system component and performing one or more actions in response to detecting the failure. As a result of the technology disclosed herein, a failover service may be configured to monitor a distributed computing system executing within a computing service (e.g., a remote computing service) for failures by registering a declarative file for the distributed computing system with the failover service.

FIG. 1 is a diagram illustrating a high level example of a system 100 that may be used to detect a failure of a component within a distributed computing system. The system 100 may include a failover service 106 that may be configured to monitor components of a distributed computing system by periodically querying the components to determine the status of the components. Examples of components of a distributed computing system that may be queried by the failover service may include distributed computing clusters, computing instance nodes 110 or distributed system services (e.g., a distributed database or a distributed file system) that execute on one or more distributed system clusters. After detecting a failure of a component, the failover service 106 may execute a failover action that may be used to mitigate the component failure or remedy the component failure.

In one example configuration, in addition to the failover service 106, the system 100 may include a control plane 104 that enables the failover service 106 to connect to various distributed computing system endpoints 114 (e.g., computing instance endpoints, network endpoints, distributed system service endpoints, etc.), and a data plane 108 enabling the failover service 106 to communicate directly with various computing instance nodes 110. A computing service administrator may start the failover service, whereupon one or more declarative files 102 and client libraries 112 may be registered with the failover service 106.

A declarative file 102 may be registered with the failover service 106 via the control plane 104. The declarative file 102 may be associated with a particular distributed computing system (e.g., a distributed computing system operating within a remote computing service environment) and may include information that: identifies the distributed computing system type (e.g., a distributed database system, a distributed file system, a peer-to-peer system, etc.), provides criteria used to detect a failure of a component included in the distributed computing system (e.g., a failure of a distributed computing cluster, a computing instance node 110 or a distributed system service), and provides a failover action that may be executed as a result of detecting a failure of a component included in the distributed computing system. Criteria specified in the declarative file 102 may include criteria for queries that may be used to determine a state of various distributed system components, criteria for time between queries (e.g., every few seconds, minutes or other frequency) made to a distributed system component and/or criteria for a number of failed queries (e.g., 3, 5, 8, etc.) that defines a failure of a distributed system component. In one example, a declarative file 102 may include instructions (e.g., a computer script or function) that may be executed by the failover service 106. For example, a declarative file 102 may contain a script that may be executed in the event of a failure of a distributed system component. Alternatively, or in addition, declarative information may be identified from one or more sources that include the information described above. For example, a declarative information source may be a relational database, a NoSQL database, a key value store (e.g., JSON JavaScript Object Notation) or another data store.

Queries specified in the declarative file 102 may be used by the failover service 106 to communicate with a distributed system component and determine whether the distributed system component may be capable of responding to the queries. In a case where a distributed system component may be able to respond to a query, the distributed system component may be in an active state. Whereas, in a case where a distributed system component does not respond to a number of failed queries, as specified in the declarative file 102, the distributed system component may be in a failure state.

Queries specified in a declarative file 102 may be specific to a particular distributed computing system type and/or to components included in the distributed computing system. For example, the definition of a failure for one distributed computing system may not be the same definition of a failure for another distributed computing system, resulting in queries that may be specific to a distributed computing system type and/or configuration. As a specific example, database tables of a distributed database management system may be queried at regular intervals to ensure that the database management system is available. Whereas, a distributed file system may be queried by identifying a network path to a computing instance node 110 used by the distributed file system to ensure that files located on the computing instance node 110 are available.

In addition, the declarative file 102 may specify various levels of queries that may be used to detect a failure of a distributed system component. For example, various levels of shallower queries and deeper queries may be defined in the declarative file 102. A shallower level query may be used to determine whether components like distributed computing clusters or computing instance nodes 110 may be in an active state. For instance, the failover service 106 may attempt to connect to computing instance nodes 110 via a data plane 108 to determine whether a distributed computing cluster and/or a computing instance node 110 included in a distributed system service may be in an active state.

As a specific example of one shallower level query, the failover service 106 may execute a network administration utility, such as a ping utility to test the reachability of a computing instance node 110 using a network address (e.g., IP address) for the computing instance node 110. The network administration utility command may be executed through the data plane 108 to communicate directly with the computing instance node 110. In a case where the computing instance node 110 responds to a request (e.g., a ping request), a determination may be made that the computing instance node 110 is in an active state. In a case where a response is not returned by the computing instance node 110 after a number of consecutive unresponsive requests, a determination may be made that the computing instance node 110 is in a failure state (e.g., the computing instance node 110 is not operating properly).

A deeper level query may be used to determine whether distributed system components, like a distributed system service (e.g., a database or file system), may be in an active state. The queries may be considered deep queries because the queries may be used to verify that a distributed system service is operationally able to respond to a deep query and provide data or a specific service rather than merely verifying that a distributed computing cluster or a computing instance node used to execute the distributed system service is in an active state.

In order to perform some deeper level queries, client libraries 112 may be registered with the failover service 106 providing a defined functional interface and/or instructions for connecting to various distributed system services. For example, a client library 112 may specify an API, a database driver or a database connection string used to connect to a distributed system service. Having registered a client library 112, the failover service 106 may query the distributed system service using client library 112 functions to determine whether the distributed system service is in an active state capable of responding to the query. In performing a query, the failover service 106 may use a query specified by the declarative file 102 to query the distributed system service. The failover service 106 may reference a client library 112 for the distributed system service and create a connection to the distributed system service via a distributed system service endpoint 114 accessible through the control plane 104. Once the connection is established, the failover service 106 may then query the distributed system service to determine the state of the distributed system service.

As one specific example of a deeper level query, the declarative file 102 may specify a query that queries various database tables of a distributed database system to determine the operational state of the distributed database system. The failover service 106 may reference a client library 112 for the distributed database system registered with the failover service 106 to obtain an API used to connect to the distributed database system. The failover service 106 may then periodically query the database tables (e.g., using a select statement) using the criteria specified in the declarative file 102 (e.g., a time between queries and a number of queries that result in the detection of a failure of the distributed database system).

In one example configuration, different levels of queries may be performed to isolate a failure of a distributed system component. For example, the declarative file 102 may specify a procedure that after detecting a failure of a distributed system component, further queries are performed to better locate the source of the failure. As an example, a computing instance node 110 may be queried as a result of detecting a failure of a distributed system service hosted by the computing instance node 110 to verify that the computing instance node 110 is able to respond to the query. In the case that the computing instance node 110 is able to respond to the query, a determination may be made that the distributed system service has failed and not the computing instance node 110 hosting the distributed system service. Additional examples of different levels of queries are provided below in relation to FIG. 5.

Various other queries not specifically mentioned here may be used to assess the state of a distributed computing system. For example, different aspects and levels of a distributed computing system may be queried, including, but not limited to, network connectivity between distributed computing clusters, computing instance nodes and network interfaces, as well as different levels of a distributed computing system's services. Also, software agents (e.g., daemons) that may be executing on computing instance nodes may report the state of various services and/or processes associated with a distributed computing system to the failover service 106, when the software agents are queried.

After a determination that a distributed system component may be in a failure state, the failover service 106 may be configured to execute a failover action specified in the declarative file 102. In one example configuration, a failover action may include notifying a computing service provider and/or a customer that a failure of a distributed system component has occurred. For instance, the failover service 106 may generate a notification alerting a customer of a failure, at which point the customer may take remedial action to address the failure. In one example, a push messaging service may be used to notify a computing service provider and/or a customer of a failure. For instance, a notification sent via a push messaging service may be directly received by network connected devices and other distributed services, and may be delivered via SMS (Short Message Service) text message or email.

In another example configuration, a failover action may include instructions for a remedial action that may be performed by the failover service 106 or the computing service provider in response to a failure of a distributed system component. Examples of remedial actions may include, but are not limited to, terminating a failing computing instance node 110 and failing over to another computing instance node 110, restarting a failing computing instance node 110, restarting a failing distributed computing system service, failing over to a second distributed computing cluster by reassigning a virtual network interface from a failing first distributed computing cluster to the second distributed computing cluster, as well as other remedial actions not specifically described here.

Figure 2:
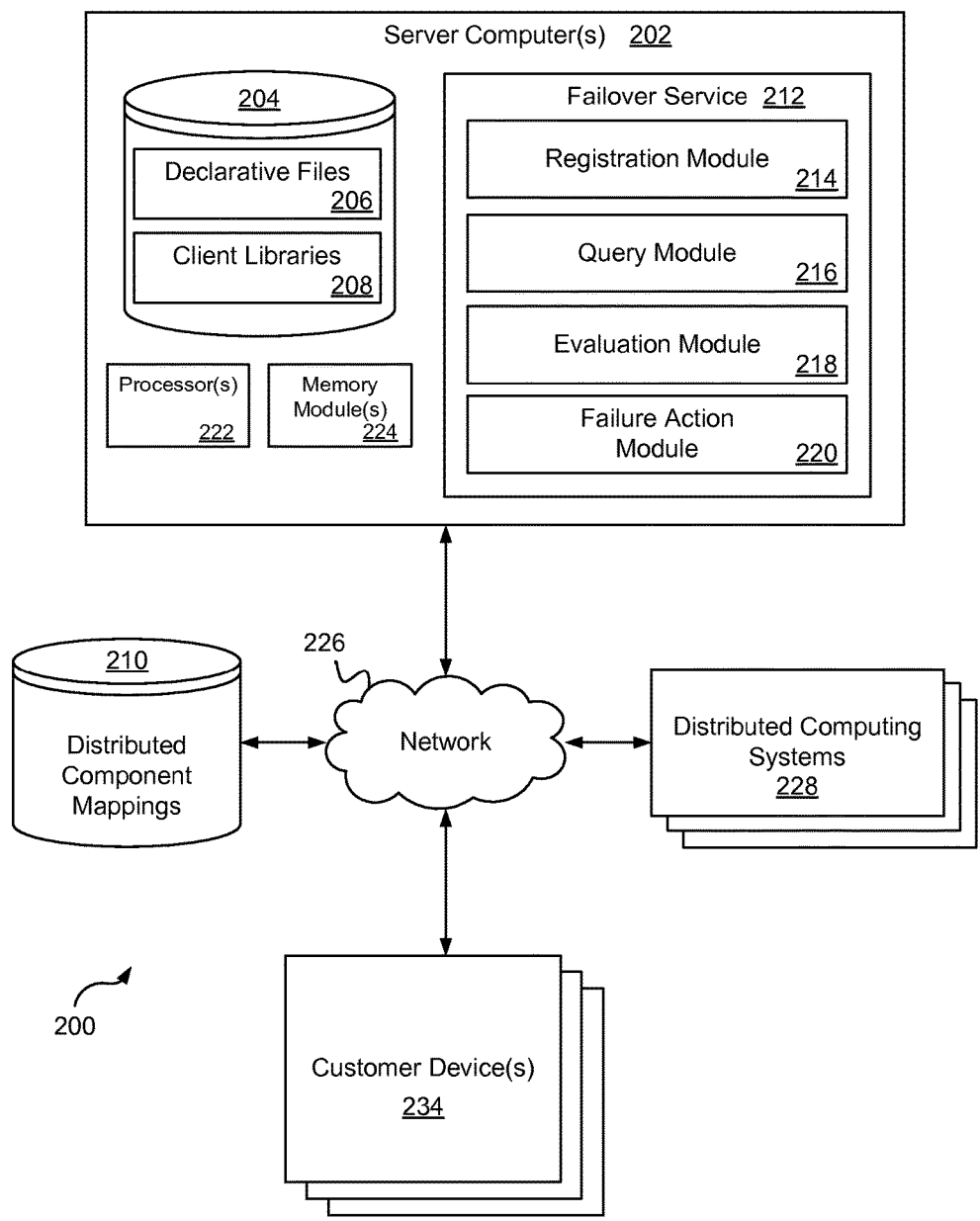
FIG. 2 is a block diagram that illustrates various example components included in a system for identifying a failure of a component of a distributed computing system.

FIG. 2 illustrates components of an example system environment 200 on which the present technology may be executed. The system environment 200 may include a server computer 202 that may be in communication via a network 226 with a number of distributed computing systems 228, a data store 210 containing distributed component mappings for a distributed computing system 228 and a number of customer devices 234. Information may be exchanged between the server computer 202 and various components of the system 200 by way of a control plane and a data plane (not shown). The server computer 202 may include a failover service 212 comprising a number of modules used to perform various functions of the failover service 212.

In one example configuration, the failover service 212 may include a registration module 214, a query module 216, an evaluation module 218 and a failure action module 220. The registration module 214 may be configured to register one or more declarative files 206 and client libraries 208 with the failover service 212. In one example, upon starting the failover service 212, declarative files 206 and client libraries 208 may be identified and information included in the declarative files 206 and the client libraries 208 may be registered with the failover service 212 by placing the information in memory (e.g., in a memory module 224), making the information available to other modules included in the failover service 212.

The failover service 212 may be configured to monitor multiple distributed computing systems 228 by registering a declarative file 206 for each distributed computing system 228 to be monitored by the failover service 212. For instance, a distributed computing system administrator may register a declarative file 206 with the failover service 212 via a user interface (not shown) for the failover service 212. Registering the declarative file 206 may cause the declarative file 206 to be uploaded to the server computer 202 where the declarative file 206 may be stored in the data store 204 and the information included in the declarative file 206 may be placed in memory. Alternatively, a file path for a declarative file 206 may be provided to the registration module 214 that allows the declarative file 206 to be located and read.

Client libraries 208 may also be registered with the failover service 212 at the time that a declarative file 206 for a distributed computing system 228 is registered. For example, a client library 208 may be provided to the failover service 212 by way of a user interface, or a client library 208 for a distributed computing system 228 may be identified from a client library collection stored on the data store 204. The client libraries 208 may provide interfaces and instructions (APIs, drivers, connection strings, etc.) for connecting to a distributed system service (e.g., a distributed database system, distributed file system, etc.). The registration module 214 may be configured to read a client library 208 and place the interface call formats and connection instructions in memory making the connection instructions and calls available to other failover service modules.

The query module 216 may be configured to detect a failure of a component included in a distributed computing system 228 by periodically querying selected components. In one example configuration, components of a distributed computing system 228 selected for monitoring may be specified in a declarative file 206. For example, a declarative file 206 may identify various distributed computing clusters, computing instance nodes and/or distributed system services that may be monitored for failures. Further, a declarative file 206 may specify how often a component may be queried. As an illustration, a declarative file 206 may instruct the query module to query a component included in a distributed computing system 228 every few seconds, minutes or some other frequency. In querying components of a distributed computing system 228, the query module 216 may obtain from memory instructions about which components to query, instructions on how to query a component and instructions on how often to query a component. The query module 216 may then cause queries to be made to the components according to the instructions.

As one illustration of a query that may be made to a component of a distributed computing system 228, computing instance nodes included in a distributed computing cluster may be queried to determine the state of the computing instance nodes by sending an echo request (e.g., via an Internet Control Message Action) using network addresses for each computing instance node. Computing instance nodes that are in an active state may respond to the echo request by returning packets sent to the computing instance nodes in the echo request. Those computing instance nodes that may be in a failure state may not respond to the echo request.

As another illustration of a query used to query a component of a distributed computing system 228, an endpoint for a component may be queried via an API to obtain granular level information about the component. As one specific example, an endpoint for a computing instance node included in a distributed computing system 228 may be queried to obtain metadata for the computing instance node. The metadata returned by the query may be analyzed to determine the state of the computing instance node. As another specific example, a network endpoint for a network servicing a distributed computing system 228 may be queried to obtain metadata for the various network connections between components of the distributed computing system 228. The metadata for the network may then be analyzed to determine the state of the network connections.

As another illustration of a query that may be made to a component of a distributed computing system 228, the various services of a distributed computing system 228 may be queried to determine the state of the services. As one specific example, a distributed database service may be queried to determine a status of various database tables included in the distributed database service. In performing the query, information may be obtained, as specified by a declarative file 206, from memory specifying which database tables to query and/or specifying a query statement (e.g., a SQL (Structured Query Language) statement) used to query the distributed database service. Also, instructions included in a client library 208 specifying how to connect to the distributed database service (e.g., an API) may be obtained from memory. The query may then be executed. In a case where the distributed database service returns information from a database table queried, the distributed database service may be in an active state. In a case where the distributed database service does not respond to the query, the distributed database service may be in a failure state.

The evaluation module 218 may be configured to obtain criteria used to detect a failure of a distributed system component from a declarative file 206 (e.g., via memory modules 224) and analyze the results of queries made to various components of a distributed computing system 228 by the query module 216. In one example configuration, results of queries made by the query module 216 may be provided to the evaluation module 218, whereupon the query results may be used to determine whether a criterion for a failure of a distributed system component has been satisfied. Illustratively, the evaluation module 218 may receive query results and track a number of failed queries. When a number of failed queries satisfies a criterion associated with a query (i.e., a criterion associated with a query of a distributed system component), then the distributed system component associated with the failed queries may be deemed to be in a failure state.

Criteria used by the evaluation module 218 to determine whether a component of a distributed computing system 228 may be in a failure state may be specified in a declarative file 206. For example, as described above, after registration of a declarative file 206, criteria included in the declarative file 206 may be placed in memory making the criteria available to the evaluation module 218. The criteria may then be used to evaluate component responses to queries.

A criterion used by the evaluation module 218 to determine whether a component of a distributed computing system 228 may be in a failure state may be specific to a particular type of component included in a distributed computing system 228. For example, a criterion may be specific to a distributed computing cluster, computing instance node or a distributed system service. As such, different rules and definitions of what constitutes a failure state may vary between component types.

One example of a criterion used to evaluate whether a failure of a component has occurred may be a number of failed queries made to a component, as indicated above. As an illustration, the criterion may specify that a number (e.g., 3, 5, 7, etc.) of failed queries of a distributed computing cluster, computing instance node or distributed system service defines a failure of the respective component.

As another example of a criterion used to evaluate query responses may be a criterion specifying that one or more additional queries be performed to better identify a source of a failure. As an illustration, results of querying a distributed file system may result in satisfying a first criterion that the distributed file system may be in a failure state. Satisfaction of the first criterion may result in the satisfaction of a second criterion specifying that the distributed computing clusters, including the computing instance nodes that comprise the distributed computing cluster, be queried to determine whether the failure detected is a failure of the distributed file system software or a failure of an operating system and/or hardware used to support the distributed file system.

The failure action module 220 may be configured to execute a failure action specified in a declarative file 206 after a determination that a component of a distributed computing system 228 may be in a failure state. For example, upon determining that a component of a distributed computing system may be in a failure state, the evaluation module 218 may make a request to the failure action module 220 to execute a failure action associated with the component. A failure action may specify one or more actions that may be performed in the event of a failure of a distributed system component. Examples of failure actions may include, but are not limited to, notifying a customer of a failure and allowing the customer to perform remedial actions, notifying a customer and executing instructions provided by the customer, executing instructions specified in a declarative file 206 (e.g., terminating or restarting a computing instance node, distributed computing cluster, distributed system service; failing over to another distributed computing cluster or computing instance node, etc.).

In one example configuration, the system 200 may include a data store 210 containing distributed component mappings for a distributed computing system 228. The configuration of a distributed computing system 228 may change over time as distributed computing clusters and computing instance nodes are added and removed from the distributed computing system 228. As a result, information for distributed computing clusters and computing instance nodes included in a distributed computing system 228 may be recorded in the data store 210 or may be kept in memory (e.g., in a memory module 224). The information in the data store 210 may include names and/or aliases of the distributed computing clusters and computing instance nodes, which may be mapped to specific distributed computing systems 228 to provide an overview of components included in a distributed computing system 228 at a particular point in time. As such, the failover service 212 may use the information to identify the components of a distributed computing system 228. Further, the components of a distributed computing system 228 may in some examples access the information to find and communicate with one another.

In one example configuration, a software agent (e.g., a daemon) may be located on the computing instance nodes of a distributed computing system 228. The software agents may periodically update the distributed system component mappings with changes that occur within a distributed computing system 228. Therefore, the failover service 212 may be provided with more accurate information via the distributed system component mappings about the structure of a distributed computing system 228 that results in fewer false detections of component failures within the distributed computing system 228.

The services and modules included in the server computer 202 and/or the components of the distributed computing systems 228 may be accessed using API calls, procedure calls or other network commands according to different technologies, including, but not limited to, Representational State Transfer (REST) technology or Simple Object Access Action (SOAP) technology. REST is an architectural style for distributed hypermedia systems. A RESTful API (which may also be referred to as a RESTful web service) is a web service API implemented using HTTP and REST technology. SOAP is an action for exchanging information in the context of Web-based services.

A customer may utilize a customer device 234 to access a customer's distributed computing system 228. Further, notifications alerting a customer to a failure of a distributed system component may be sent to a customer device 234 (e.g., via a push messaging service), whereupon the customer may take remedial action that addresses the failure. A customer device 234 may include any device capable of sending and receiving data over a network 226. A customer device 234 may comprise, for example a processor-based system such as a computing device. A customer device 234 may be a device such as, but not limited to, a desktop computer, laptop or notebook computer, tablet computer, handheld computer, workstation, network computer, or other devices with like capability.

The various processes and/or other functionality contained within the system environment 200 may be executed on one or more processors 222 that are in communication with one or more memory modules 224. The system environment 200 may include a number of server computers 202 that are arranged, for example, in one or more server banks or computer banks or other arrangements. The server computers 202 may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store 204 and 210 may include storage systems such as a SAN (Storage Area Network), cloud storage network, volatile or non-volatile RAM, optical media, or hard-drive type media. The data store may be representative of a plurality of data stores as can be appreciated.

The network 226 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
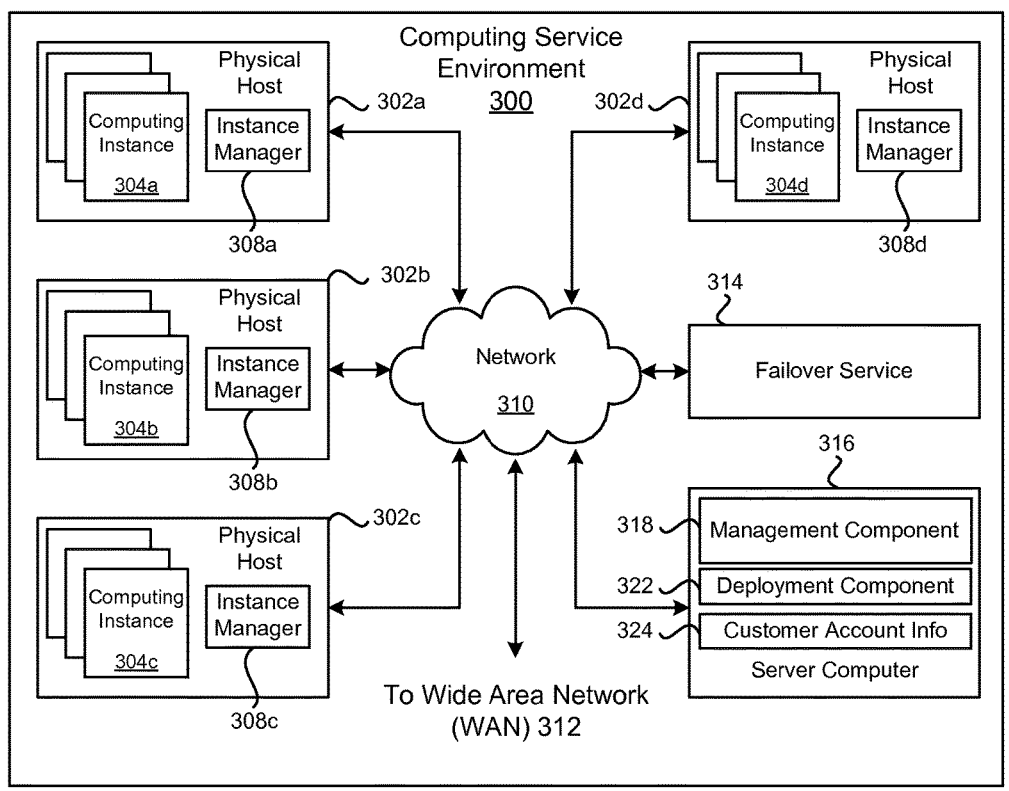
FIG. 3 is a block diagram that illustrates an example computing service environment that includes a failover service.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a failover service used to detect a failure of a computing instance and/or a distributed system service used in a distributed computing system. The failover service may in some examples further execute a failover action used to mitigate or recover from a failure occurring within a distributed computing system operating within the computing service environment 300.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

FIG. 4 illustrates one example of a declarative file 402 that may be registered with a failover service. In one example, a declarative file 402 may be associated with a particular distributed computing system and may include information used to detect a failure of a component included in the distributed computing system. In another example, a declarative file 402 may be associated with a number of distributed computing systems, wherein information included in the declarative file 402 may be applied to each distributed computing system identified by the declarative file 402, or alternatively, the information included in the declarative file 402 may be structured (e.g., via a key value pair) such that information associated with a particular distributed computing system may be identified. Illustratively, a declarative file 402 may be written using a key value pair format. For example, XML (Extensible Markup Language), JSON (JavaScript Object Notation) or similar key value pair format.

Information included in a declarative file 402 may identify various components of a distributed computing system (i.e., hardware and software), specify query types (e.g., direct query or endpoint query) used to query the components, specify network addresses used to communicate with the various components, specify criteria for querying a component, as well as specify criteria for detecting a failure of a component. Also, a declarative file 402 may include a failover action that may be executed as a result of detecting a failure of a component. As will be appreciated, additional information not specifically mentioned above may be included in a declarative file 402 that may be used in detecting a failure of a component of a distributed computing system.

Illustrated in FIG. 4 is one specific example of a declarative file 402 formatted to identify one or more distributed computing clusters 404 that may be included in a distributed computing system. For example, the declarative file 402 may identify a distributed computing cluster 428 that may be currently in production and a failover distributed computing cluster 430. The distributed computing clusters 404 may be identified via a cluster name 406. Further, the declarative file 402 may identify computing instance nodes included in a distributed computing cluster 404. For example, a master computing instance node included in the distributed computing cluster 404 may be identified by specifying a computing instance type 418 and a computing instance alias 422 for the master computing instance node, as well as identifying a virtual network interface 420 assigned to the master computing instance node. Worker computing instance nodes included in the distributed computing clusters 404 may also be identified by providing computing instance types 424a-b and aliases 426a-b for the worker computing instance nodes.

The declarative file 402 may provide query information used to query a distributed computing cluster 404. For example, a network address and port number may be specified that may be used to send a query 408 to a distributed computing cluster, and a network address and port number used to receive a response 410 from the distributed computing cluster to the query.

Failure criteria specified in the declarative file 402 may include a query interval 412 specifying a time (e.g., a frequency) between queries made to a distributed computing cluster 404 and a failure interval 414 specifying a number of consecutive unresponsive queries that may be sent to a distributed system component that defines a distributed system component failure. The declarative file 402 may also include a failover action 416 specifying an action to perform in the event that a failure of a distributed computing cluster or computing instance node is detected. For example, as illustrated in FIG. 4, the failover action 416 specifies failing over to another distributed computing cluster.

While FIG. 4 illustrates one example of a declarative file format used as part of a failover service, many other similar or different declarative file formats are possible. The example declarative file format discussed and illustrated above is merely representative and not limiting.

Figure 5:
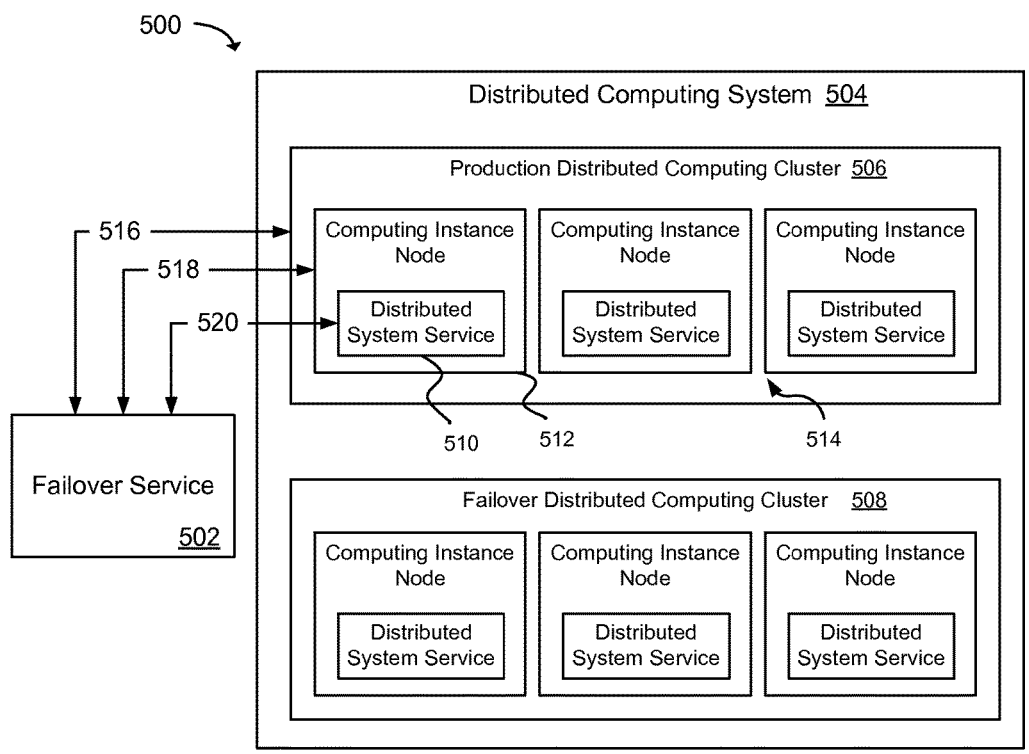
FIG. 5 is a diagram that illustrates an example system and method for querying components of a distributed computing system to identify a state of the components.

Moving now to FIG. 5, a diagram illustrates an example system and method 500 for querying components of a distributed computing system 504 to identify a state of the components. As illustrated, the components included in the distributed computing system 504 may include a distributed computing cluster 506 that may be in production and a failover distributed computing cluster 508, each containing a number of computing instance nodes 514 that may host a distributed system service 510.

A failover service 502 may be configured to query the different components of the distributed computing system 504 via a queries specified by a declarative file. In one example, the failover service 502 may be configured to use a number of different queries to monitor and detect failures of different components of the distributed computing system 504. For example, a first query 516 may be used to determine a state of a distributed computing cluster 506. A second query 518 may be used to determine a state of individual computing instance nodes 514 and a third query 520 may be used to determine a state of a distributed system service 510.

As one example illustrating how the different queries may be used, the status of the various components of the distributed computing system 504 may be monitored using the above queries (i.e., the first query 516, second query 518 and third query 520) by querying each of the components of the distributed computing system 504 periodically. Namely, the distributed computing cluster 506 may be queried, where each of the computing instance nodes 514 may be queried and the distributed system services 510 hosted on the computing instance nodes 514 may be queried.

As another example, states of the components of the distributed computing system 504 may be monitored at a high level by periodically querying the distributed computing cluster 506 using the first query 516. In the event that the first query 516 detects that the distributed computing cluster 506 may be in a failure state, a deeper query may be performed to determine which component included in the distributed computing cluster 506 may have failed. Illustratively, the computing instance nodes 514 may be queried using the second query 518, and if a failing computing instance node 514 is not identified, then the distributed system services 510 hosted by the computing instance nodes 514 may be queried using the third query.

As another example, states of the components of the distributed computing system 504 may be monitored at a low level by periodically querying the distributed system services 510 and/or the computing instance nodes 514. For example, distributed system services 510 may be queried periodically using the third query 520, and in the event that a failure of a distributed system service 510 is identified, a query may be made to a computing instance node 512 hosting the distributed system service 510 and/or to the distributed computing cluster 506 to determine the state of the computing instance node 512 and/or the distributed computing cluster 506.

Figure 6:
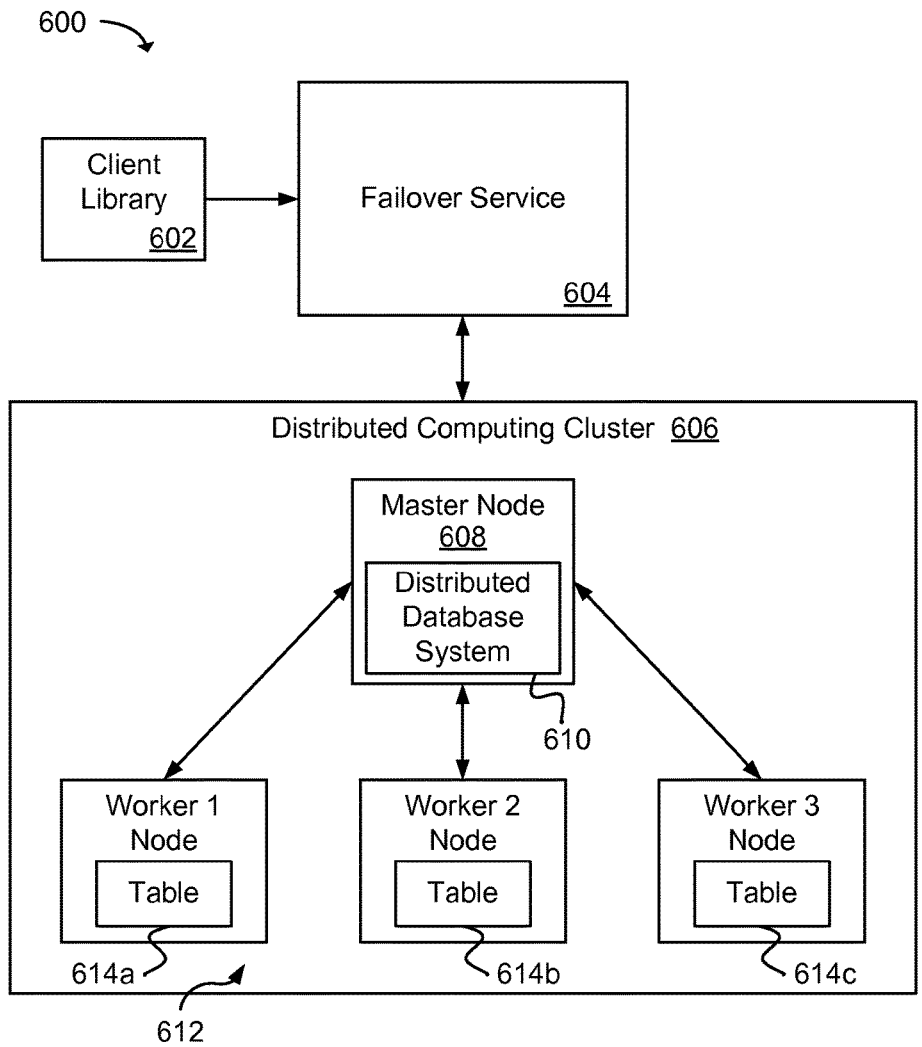
FIG. 6 is a block diagram illustrating an example system and a method for querying database tables included in a distributed database system to determine the state of the distributed database system.

FIG. 6 is a block diagram illustrating an example of a system and a method 600 for querying database tables included in a distributed database system 610 to determine the state of the distributed database system 610. The system may include a failover service 604 and a distributed computing cluster 606 containing a master computing instance node 608 and a number of worker computing instance nodes 612. As described earlier, a client library 602 for a distributed computing system (e.g., distributed database system, distributed file system, etc.) may be registered with a failover service 604, providing the failover service 604 with an interface that may be used to connect to the distributed computing system. As illustrated, a client library 602 for the distributed database system 610 may be registered with the failover service 604, allowing the failover service 604 to query tables 614*a-c* included in the distributed database system 610.

In the example illustrated, database tables 614*a-c* may be placed on the worker computing instance nodes 612. The database tables 614*a-c* may be known to the failover service 604 such that the database tables 614*a-c* may contain information that when returned to the failover service 604 by way of a query, identifies the worker computing instance node 612 on which the database table 614*a-c* resides. As an example of a method for identifying a failure state of a worker computing instance 612, the failover service 604 may perform a query (or queries) that select information from each of the database tables 614*a-c*. The result of a query may be analyzed to determine whether each of the worker computing instance nodes 612 was able to respond to the query. In determining that one or more worker computing instance nodes did not respond to the query, a failover action may be performed.

Figure 7:
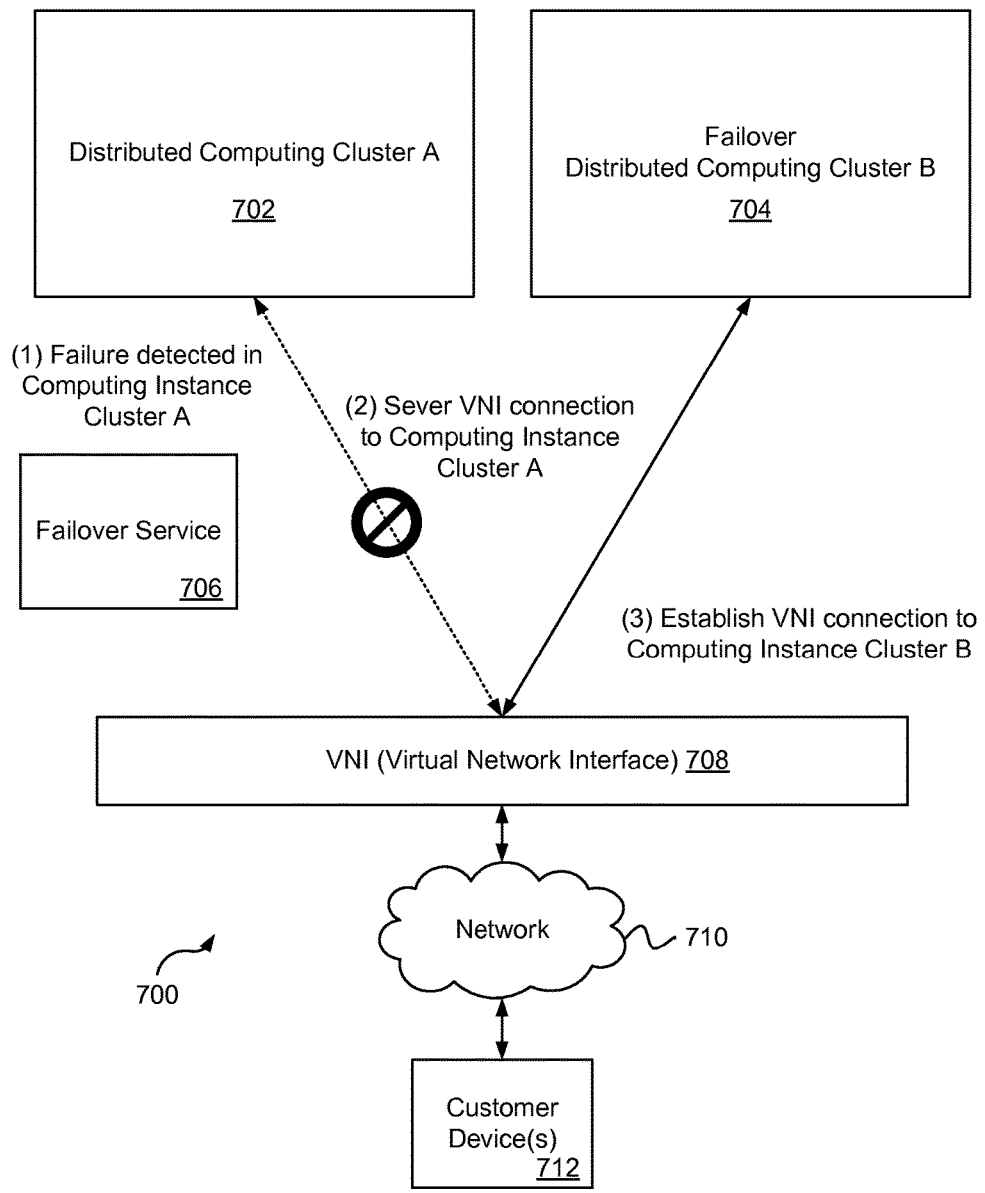
FIG. 7 is a block diagram that illustrates an example system and method for a failover action.

FIG. 7 is a block diagram illustrating one example of a system and a method 700 for a failover action. The system may include a failover service 706 that may monitor a state of the distributed computing cluster 702. The system may also include the failover distributed computing cluster 704 that, for example, may be mirrored (i.e., data for the distributed computing cluster 702 may be mirrored to the failover distributed computing cluster 704). Customers may connect to the distributed computing cluster 702 via a virtual network interface 708 that allows a customer device 712 to connect to the distributed computing cluster 702 through a network 710.

In the example method illustrated, as a result of (1) the failover service 706 identifying a failure of a component within the distributed computing cluster 702, the failover service 706 may (2) execute a failover action that disassociates (e.g., servers) a virtual network interface 708 used to connect to the distributed computing cluster 702 and (3) establish a virtual network interface 708 connection to a failover distributed computing cluster 704. As a result, the failing distributed computing cluster 702 may be "fenced" off from the network 710 and the failover distributed computing cluster 704 may be used to restore distributed system services to customers.

Various other failover actions may be performed in response to a failure of a component included in a distributed computing system. For example, a failover action may include removing a computing instance node or distributed system service from a distributed computing cluster 702, terminating a computing instance node or distributed system service, restarting a computing instance node or distributed system service, as well as other failover actions that may be used in the event of a distributed computing system failure.

Figure 8:
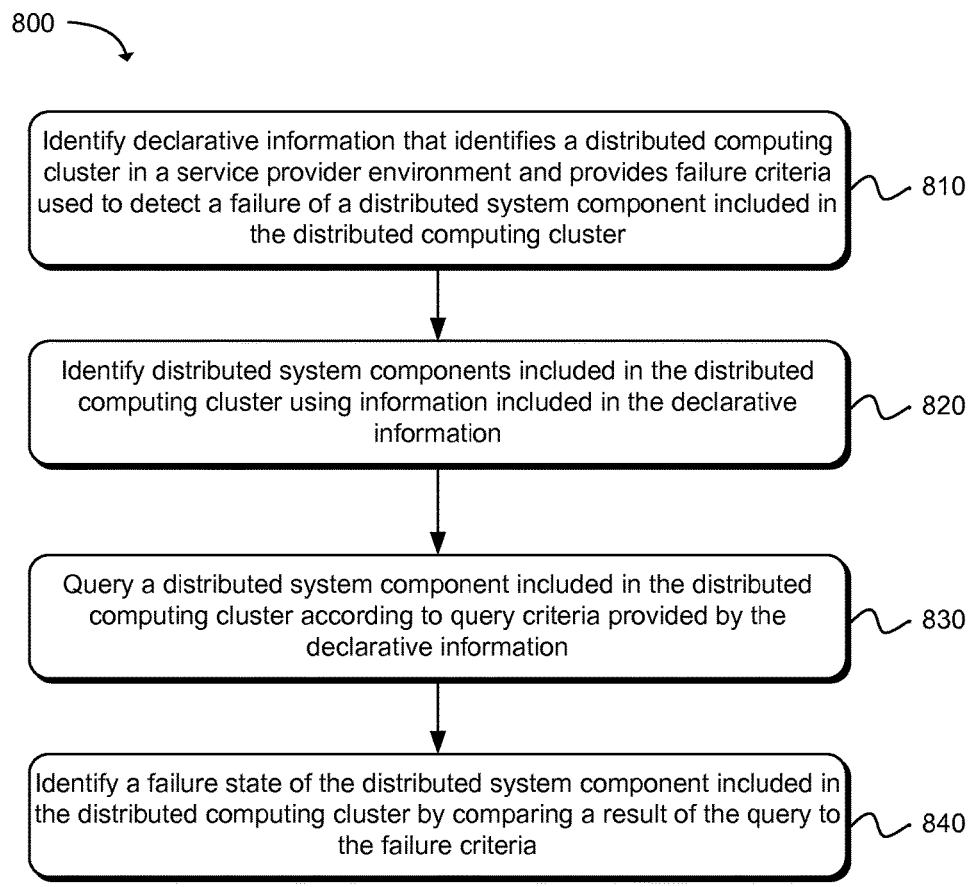
FIG. 8 is a flow diagram illustrating an example method for identifying a failure state of a distributed system component included in a distributed computing cluster.

FIG. 8 is a flow diagram illustrating an example of a method 800 for identifying a failure state of a distributed system component included in the distributed computing cluster. Beginning in block 810, declarative information may be identified that identifies a distributed computing cluster in a service provider environment and provides failure criteria used to detect a failure of a distributed system component included in the distributed computing cluster. Also, the declarative information may provide a failover action that may be performed in response to detecting a failure of a distributed system component.

As in block 820, distributed system components included in the distributed computing cluster may be identified using information included in the declarative information. The distributed system components may include computing instance nodes and distributed system services as described earlier.

As in block 830, a distributed system component included in the distributed computing cluster may be queried according to the query criteria provided by the declarative information. For example, the computing instance nodes included in the distributed computing cluster may be queried according to the failure criteria specified by the declarative information to determine a state of the computing instance nodes, and the distributed system services hosted on the computing instance nodes may be queried according to the failure criteria to determine a state of the distributed system services.

As in block 840, a failure state of the distributed system component included in the distributed computing cluster may be identified by comparing a result of the query to the failure criteria. For example, comparing the result of the query to the failure criteria may show that a computing instance node may not be responding to a query, a determination may be made that the state of the computing instance node may be in a failure state. Likewise, in a case where a distributed system service hosted on a computing instance node may not respond to a query, a determination may be made that the state of the distributed system service may be in a failure state. In some examples, after identifying that a distributed system component may be in a failure state, a failover action specified in the declarative information may be executed.

Figure 9:
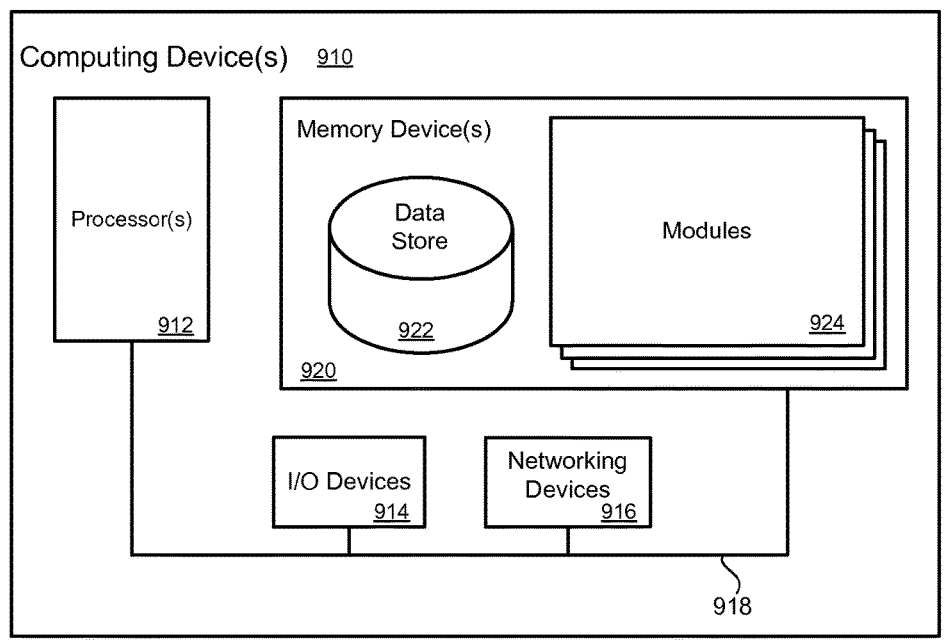
FIG. 9 is block diagram illustrating an example of a computing device that may be used to execute a method for detecting a failure of a component within a distributed computing system.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. The modules 924 may include a registration module, a query module, evaluation module, failure action module, as well as other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by one or more processors:
register a declarative file with a failover service, wherein the declarative file identifies a distributed computing cluster in a service provider environment and specifies failure criteria used to detect a failure of a distributed system component and a failover action that is executed as a result of detecting a failure of the distributed system component;

register a client library with the failover service, wherein the client library provides an interface to distributed system services;

identify distributed system components included in the distributed computing cluster using information included in the declarative file, the distributed system components including computing instance nodes and the distributed system services;

query the computing instance nodes included in the distributed computing cluster according to failure criteria specified by the declarative file to determine a state of the computing instance nodes;

query the distributed system services hosted on the computing instance nodes according to the failure criteria provided by the declarative file to determine a state of the distributed system services, wherein the distributed system services are queried using the client library to connect to the distributed system services; and execute the failover action as a result of a query returning a state indicating a failure of a distributed system component included in the distributed computing system.

2. A non-transitory machine readable storage medium as in claim 1, wherein instructions that when executed by the one or more processors enact a failover action that disassociates a virtual network interface from a first distributed computing cluster containing a failing distributed system component and associates the virtual network interface with a second distributed computing cluster.

3. A computer implemented method, comprising:

registering a declarative file that identifies a distributed computing cluster in a service provider environment and provides failure criteria used to detect a failure of a distributed system component included in the distributed computing cluster and specifies a failover action that is executed as a result of detecting a failure of the distributed system component;

registering a client library that provides an interface to the distributed system component included in the distributed computing cluster;

identifying the distributed system component included in the distributed computing cluster using the declarative file;

querying the distributed system component included in the distributed computing cluster using the client library to connect to the distributed system component and determine a state of the distributed system component according to failure criteria provided by the declarative file;

identifying a failure state of the distributed system component included in the distributed computing cluster by comparing a result of the querying the distributed system component to the failure criteria; and executing the failover action.

4. A method as in claim 3, further comprising detecting the failure state of the distributed system component that disassociates the distributed system component from the distributed computing cluster.

5. A method as in claim 3, wherein the declarative file specifies a query used to determine whether a computing instance node is able to respond to the query.

6. A method as in claim 3, wherein the declarative file specifies a query used to determine whether a distributed system service hosted by a computing instance node included in the distributed computing cluster is able to respond to the query.

7. A method as in claim 3, wherein the declarative file specifies a query that selects information from tables located on computing instance nodes included in the distributed computing cluster to verify that a distributed database system is able to respond to the query.

8. A method as in claim 3, wherein the declarative file provides a criterion specifying a number of consecutive unresponsive queries that are sent to a distributed system component that defines a distributed system component failure.

9. A method as in claim 3, wherein the declarative file provides a criterion specifying a time between queries made to the distributed system component.

10. A method as in claim 3, wherein the declarative file specifies a criterion for querying a computing instance node included in the distributed computing cluster as a result of detecting a failure of a distributed system service hosted by the computing instance node to verify that the computing instance node is able to respond to a query.

11. A method as in claim 3, wherein the declarative file identifies computing instance nodes that are included in the distributed computing cluster.

12. A method as in claim 3, wherein the declarative file specifies a failover distributed computing cluster that is used in an event of a failure of a distributed system component included in the distributed computing cluster.

13. A method as in claim 3, wherein the declarative file specifies a virtual network interface used to access the distributed computing cluster.

14. A method as in claim 3, further comprising obtaining distributed system component information from a data store containing distributed component mappings for the distributed computing cluster that is updated when modifications to the distributed computing cluster are made.

15. A system comprising:

one or more processors;

a memory device including instructions that, when executed by the one or more processors, cause the system to:

register a declarative file that:
identifies a distributed computing cluster,
specifies a query used to determine whether computing instance nodes or services of the distributed computing cluster are able to respond to the query,
specifies a number of consecutive unresponsive queries that are sent to the computing instance nodes and the services that define a distributed system component failure,
specifies a time between queries made to the computing instance nodes and the services,
specifies failure criteria used to detect a failure of a component included in the distributed computing cluster, and
specifies a failover action for notifying a customer as a result of detecting a failure of the component;

register a client library that provides at least one interface to components of the distributed computing cluster;

identify the components of the distributed computing cluster that include computing instance nodes and services of the distributed computing cluster using distributed computing cluster information included in the declarative file;

query the components of the distributed computing cluster according to failure criteria specified by the declarative file using the client library to connect to the components of the distributed computing cluster; and execute the failover action as a result of a query returning a state indicating a failure of a component of the distributed computing cluster.

16. A system as in claim 15, wherein the memory device includes instructions that, when executed by the one or more processors, causes the system to execute the failover action that pushes a notification to the customer via a push messaging service.

17. A system as in claim 15, wherein the memory device includes instructions that, when executed by the one or more processors, causes the system to execute the failover action that identifies instructions provided by the customer and performs the instructions.

18. A system as in claim 15, wherein the memory device includes instructions that, when executed by the one or more processors, causes the system to register the declarative file that specifies a query used to determine whether a computing instance node included in the distributed computing cluster is able to respond to a the query as a result of detecting a failure of a distributed system service hosted by the computing instance node.

\* \* \* \* \*